(12) United States Patent
Totolos, Jr. et al.

(10) Patent No.: US 11,334,960 B2
(45) Date of Patent: May 17, 2022

(54) SYSTEMS AND METHODS FOR PIPELINED PROCESSING OF SENSOR DATA USING HARDWARE

(71) Applicant: UATC, LLC, San Francisco, CA (US)

(72) Inventors: George Totolos, Jr., Cranberry Township, PA (US); Joshua Oren Silberman, Redwood City, CA (US)

(73) Assignee: UATC, LLC, Mountain View, CA (US)

( * ) Notice: Subject to any disclaimer, the term of this patent is extended or adjusted under 35 U.S.C. 154(b) by 619 days.

(21) Appl. No.: 16/131,529

(22) Filed: Sep. 14, 2018

(65) Prior Publication Data

US 2019/0377965 A1 Dec. 12, 2019

Related U.S. Application Data

(60) Provisional application No. 62/682,550, filed on Jun. 8, 2018.

(51) Int. Cl.
*G06T 1/20* (2006.01)
*G06K 9/46* (2006.01)
(Continued)

(52) U.S. Cl.
CPC .............. *G06T 1/20* (2013.01); *G01S 17/89* (2013.01); *G01S 17/931* (2020.01);
(Continued)

(58) Field of Classification Search
CPC .......... G06T 1/20; G06N 20/00; G06N 3/063; G06N 3/0454; G06K 9/46; G06K 9/6267;
(Continued)

(56) References Cited

U.S. PATENT DOCUMENTS 6,337,692 B1  1/2002  Rai et al.
6,542,111 B1  4/2003  Wilson
(Continued)

FOREIGN PATENT DOCUMENTS

JP    2006159939    6/2006
WO   WO 2013155661  10/2013

OTHER PUBLICATIONS

Cizek, P., Faigl, J., Masri, D, "Low-latency image processing for vision-based navigation systems," 2016 IEEE International Conference on Robotics and Automation (ICRA), 2016, pp. 781-786, doi: 10.1109/ICRA.2016.7487207. (Year: 2016).*
(Continued)

*Primary Examiner* — Nancy Bitar
*Assistant Examiner* — Daniella M. DiGuglielmo
(74) *Attorney, Agent, or Firm* — Dority & Manning, P.A.

(57) ABSTRACT

In one example embodiment, a computer-implemented method includes obtaining sensor data from a sensor, the sensor data corresponding to an image frame, and the sensor data including a first portion that corresponds to a portion of the image frame. The method includes pipelining the first portion of the sensor data into a machine-learned model before the sensor data corresponding to the entire image frame is transferred from the sensor to a memory device, to perform one or more inference operations on the first portion of the sensor data. The method includes generating as an output of the machine-learned model, in response to pipelining the sensor data corresponding to each portion of the image frame into the machine-learned model, a detection or classification of the one or more objects indicated within the sensor data.

20 Claims, 10 Drawing Sheets

(51) Int. Cl.
  *G06K 9/62* (2022.01)
  *G06K 9/00* (2022.01)
  *G01S 17/89* (2020.01)
  *G06N 20/00* (2019.01)
  *G06N 3/04* (2006.01)
  *G01S 17/931* (2020.01)
  *G06N 3/063* (2006.01)

(52) U.S. Cl.
  CPC .......... *G06K 9/00791* (2013.01); *G06K 9/46* (2013.01); *G06K 9/6267* (2013.01); *G06K 9/6271* (2013.01); *G06N 3/0454* (2013.01); *G06N 20/00* (2019.01); *G06N 3/063* (2013.01)

(58) Field of Classification Search
  CPC .. G06K 9/00791; G06K 9/6271; G01S 17/89; G01S 17/931
  USPC ...................................................... 382/103
  See application file for complete search history.

(56) References Cited

U.S. PATENT DOCUMENTS

| | | | |
|---|---|---|---|
| 6,795,031 | B1 | 9/2004 | Walker et al. |
| 7,102,496 | B1 | 9/2006 | Ernst, Jr. et al. |
| 7,124,027 | B1 | 10/2006 | Ernst, Jr. et al. |
| 7,783,403 | B2 | 8/2010 | Breed |
| 8,145,402 | B2 | 3/2012 | Craig |
| 9,223,013 | B2 | 12/2015 | Stein et al. |
| 9,330,321 | B2 | 5/2016 | Schamp et al. |
| 9,672,446 | B1 | 6/2017 | Vallespi-Gonzalez |
| 10,887,433 | B2* | 1/2021 | Fu .......................... H04L 69/22 |
| 2003/0040944 | A1 | 2/2003 | Hileman |
| 2006/0002586 | A1 | 1/2006 | Aggarwal et al. |
| 2006/0208911 | A1 | 9/2006 | Davis |
| 2008/0040004 | A1 | 2/2008 | Breed |
| 2008/0129475 | A1 | 6/2008 | Breed et al. |
| 2009/0010495 | A1 | 1/2009 | Schamp et al. |
| 2009/0146813 | A1 | 6/2009 | Nuno |
| 2009/0216600 | A1 | 8/2009 | Hill |
| 2010/0165323 | A1 | 7/2010 | Fiess |
| 2011/0249073 | A1 | 10/2011 | Cranfill et al. |
| 2012/0158313 | A1 | 6/2012 | Wang |
| 2012/0242492 | A1 | 9/2012 | Grunfeld |
| 2014/0046585 | A1 | 2/2014 | Morris et al. |
| 2014/0336842 | A1 | 11/2014 | Jang et al. |
| 2015/0036942 | A1 | 2/2015 | Smirnov et al. |
| 2015/0063708 | A1 | 3/2015 | Sripadarao et al. |
| 2015/0210274 | A1 | 7/2015 | Clarke et al. |
| 2015/0235073 | A1 | 8/2015 | Hua et al. |
| 2015/0247733 | A1 | 9/2015 | Horihata |
| 2015/0269733 | A1 | 9/2015 | Kosaki |
| 2015/0331422 | A1 | 11/2015 | Hartung et al. |
| 2015/0339811 | A1 | 11/2015 | Zhong et al. |
| 2016/0171285 | A1 | 6/2016 | Kim et al. |
| 2016/0171331 | A1 | 6/2016 | Csefalvay |
| 2016/0182874 | A1 | 6/2016 | Richards et al. |
| 2017/0206431 | A1 | 7/2017 | Sun et al. |
| 2017/0339417 | A1 | 11/2017 | Puri et al. |
| 2018/0025235 | A1 | 1/2018 | Fridman |
| 2018/0107215 | A1* | 4/2018 | Djuric ...................... G06N 3/04 |
| 2019/0171912 | A1* | 6/2019 | Vallespi-Gonzalez ...................... G06K 9/6282 |

OTHER PUBLICATIONS

Lyu, Y., Bai, L., Huang, X., "Real-Time Road Segmentation Using LiDAR Data Processing on an FPGA," 2018 IEEE International Symposium on Circuits and Systems (ISCAS), 2018, pp. 1-5, doi: 10.1109/ISCAS.2018.8351244. (Year: 2018).*

García, G. J., Jara, C. A., Pomares, J., Alabdo, A., Poggi, L. M., & Torres, F. (2014). A survey on FPGA-based sensor systems: towards intelligent and reconfigurable low-power sensors for computer vision, control and signal processing. Sensors (Basel, Switzerland), 14(4), 6247-6278. (Year: 2014).*

Cizek et al, "Low-Latency Image Processing for Vision-Based Navigation Systems", Conference on Robotics and Automation, May 16-21, 2016, Stockholm, Sweden, pp. 781-786.

Haag et al, "Incremental Recognition of Traffic Situations from Video Image Sequences", Image and Vision Computing, vol. 18, Issue 2, Jan. 2000, pp. 137-153.

International Search Report and Written Opinion for PCT/US2019/035582 dated Sep. 5, 2019, 12 pages.

Dollar et al., Fast Feature Pyramids for Object Detection, IEEE Transactions on Pattern Analysis and Machine Intelligence, vol. 36, Issue 8, Aug. 2014, pp. 1532-1545.

International Search Report and Written Opinion issued in PCT/US2016/031929 dated Aug. 17, 2016.

International Search Report and Written Opinion issued in PCT/US2016/066235 dated Mar. 27, 2017.

* cited by examiner

| SENSOR DATA | ROWS: | t1 1-3 | t2 2-4 | t3 3-5 | t4 4-6 | t5 5-7 | t6 6-8 | t7 7-9 | t8 8-10 |
|---|---|---|---|---|---|---|---|---|---|
| FIRST INFERENCE OPERATION PIPELINE (3X3) | TABLE B (ELEMENTS): | ROW 1 | ROW 2 | ROW 3 | ROW 4 | ROW 5 | ROW 6 | ROW 7 | ROW 8 |
| SECOND INFERENCE OPERATION PIPELINE (4X4) | TABLE C (ELEMENTS): | | | | ROW 1 | ROW 2 | ROW 3 | ROW 4 | ROW 5 |
| THIRD INFERENCE OPERATION PIPELINE (2X2) | TABLE D (ELEMENTS): | | | | | | | | ROW 1 |

FIG. 2A

| SENSOR DATA | 1 | 2 | 3 | 4 | 5 | 6 | 7 | 8 | 9 | 10 | 11 | 12 | 13 | 14 | ... | 48 |
|---|---|---|---|---|---|---|---|---|---|---|---|---|---|---|---|---|
| R1 | 1 | 2 | 3 | 4 | 5 | 6 | 7 | 8 | 9 | 10 | 11 | 12 | 13 | 14 | ... | 48 |
| R2 | 49 | 50 | 51 | 52 | 53 | 54 | 55 | 56 | 57 | 58 | 59 | 60 | 61 | 62 | ... | 96 |
| R3 | 97 | 98 | 99 | 100 | 101 | 102 | 103 | 104 | 105 | 106 | 107 | 108 | 109 | 110 | ... | 144 |
| R4 | 145 | 146 | 147 | 148 | 149 | 150 | 151 | 152 | 153 | 154 | 155 | 156 | 157 | 158 | ... | 192 |
| R5 | 193 | 194 | 195 | 196 | 197 | 198 | 199 | 200 | 201 | 202 | 203 | 204 | 205 | 206 | ... | 240 |
| R6 | 241 | 242 | 243 | 244 | 245 | 246 | 247 | 248 | 249 | 250 | 251 | 252 | 253 | 254 | ... | 288 |
| R7 | 289 | 290 | 291 | 292 | 293 | 294 | 295 | 296 | 297 | 298 | 299 | 300 | 301 | 302 | ... | 336 |
| R8 | 337 | 338 | 339 | 340 | 341 | 342 | 343 | 344 | 345 | 346 | 347 | 348 | 349 | 350 | ... | 384 |
| R9 | 385 | 386 | 387 | 388 | 389 | 390 | 391 | 392 | 393 | 394 | 395 | 396 | 397 | 398 | ... | 432 |
| R10 | 433 | 434 | 435 | 436 | 437 | 438 | 439 | 440 | 441 | 442 | 443 | 444 | 445 | 446 | ... | 480 |
| R11 | 481 | 482 | 483 | 484 | 485 | 486 | 487 | 488 | 489 | 490 | 491 | 492 | 493 | 494 | ... | 528 |
| R12 | 529 | 530 | 531 | 532 | 533 | 534 | 535 | 536 | 537 | 538 | 539 | 540 | 541 | 542 | ... | 576 |
| ... | ... | ... | ... | ... | ... | ... | ... | ... | ... | ... | ... | ... | ... | ... | ... | ... |
| R48 | 2257 | 2258 | 2259 | 2260 | 2261 | 2262 | 2263 | 2264 | 2265 | 2266 | 2267 | 2268 | 2269 | 2270 | ... | 2304 |

FIG. 2B

| TABLE C | | 230 | 231 | | | |
|---|---|---|---|---|---|---|
| R1 | | 1 | 2 | 3 | 4 | ... |
| R2 | | 5 | 6 | 7 | 8 | ... |
| R3 | | 9 | 10 | 11 | 12 | ... |
| R4 | | 13 | 14 | 15 | 16 | ... |
| R5 | | 17 | 18 | 19 | 20 | ... |
| ⋮ | | ⋮ | ⋮ | ⋮ | ⋮ | |

FIG. 2D

| TABLE D | | 240 | | |
|---|---|---|---|---|
| R1 | | 1 | 2 | ... |
| ⋮ | | ⋮ | ⋮ | |

FIG. 2E

SYSTEMS AND METHODS FOR PIPELINED PROCESSING OF SENSOR DATA USING HARDWARE

PRIORITY CLAIM

The present application claims the benefit of priority of U.S. Provisional Patent Application No. 62/682,550, filed Jun. 8, 2018, and entitled "Systems and Methods for Pipelined Processing Of Sensor Data Using Hardware," the disclosure of which is incorporated by reference herein in its entirety.

FIELD

The present disclosure relates generally to incrementally processing data, and more particularly to systems and methods for pipelined processing of sensor data using hardware.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of an environment proximate to the autonomous vehicle, the autonomous vehicle can identify an appropriate motion plan through such environment.

SUMMARY

Aspects and advantages of the present disclosure will be set forth in part in the following description, or may be learned from the description, or may be learned through practice of the embodiments.

One example aspect of the present disclosure is directed to an image processing system. The image processing system includes a field programmable gate array (FPGA) device coupled to one or more sensors that are configured to obtain sensor data corresponding to an image frame. The FPGA device includes one or more memory devices that are configured to store a representation of a machine-learned model that detects or classifies one or more objects indicated within the sensor data. The FPGA device is further configured to receive a plurality of increments of the sensor data as each increment of the sensor data becomes available and to implement one or more image processing pipelines for pre-processing the sensor data. The one or more image processing pipelines include a first plurality of logic blocks and interconnectors programmed to extract one or more features from one or more increments of the plurality of increments of the sensor data and generate first input data, each increment of the sensor data corresponding to a portion of the image frame. The first input data is input as one or more increments to one or more layers of the machine-learned model, the machine-learned model processing each increment of the first input data as the first input data is received at the one or more layers, to provide an output indicative of a detection or classification of the one or more objects indicated within the sensor data.

Another example aspect of the present disclosure is directed to an autonomous vehicle. The autonomous vehicle includes an FPGA device coupled to one or more sensors that are configured to obtain sensor data corresponding to an image frame. The FPGA device includes one or more memory devices that are configured to store a representation of a machine-learned model that detects or classifies one or more objects indicated within the sensor data. The FPGA device further configured to receive a plurality of increments of the sensor data as each increment of the sensor data becomes available and to implement one or more image processing pipelines for pre-processing the sensor data. The one or more image processing pipelines include a first plurality of logic blocks and interconnectors programmed to extract one or more features from one or more increments of the plurality of increments of the sensor data and generate first input data, each increment of the sensor data corresponding to a portion of the image frame. The first input data is input as one or more increments to one or more layers of the machine-learned model, the machine-learned model processing each increment of the first input data as the first input data is received at the one or more layers, to provide an output indicative of a detection or classification of the one or more objects indicated within the sensor data.

Yet another example aspect of the present disclosure is directed to a computer-implemented method. The method includes obtaining sensor data that is outputted by one or more sensors as the sensor data becomes available. The sensor data includes a plurality of increments of data, and the computing system receives each of the plurality of increments of data. The method includes determining a number of increments of data associated with a first inference operation. The method includes inputting, into a machine-learned model, a first portion of the sensor data upon receipt of the first portion of sensor data. The first portion of the sensor data includes a subset of the plurality of increments of data that corresponds to the number of increments associated with the first inference operation, and the machine-learned model causes the first inference operation to be performed on the first portion of the sensor data. The method includes obtaining, an output of the machine-learned model based at least in part on the first inference operation, a classification of one or more objects indicated within the sensor data.

Other example aspects of the present disclosure are directed to systems, methods, vehicles, apparatuses, tangible, non-transitory computer-readable media, and memory devices for pipelined processing of sensor data.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIG. 2A-2E depict example inference operation pipelines of a sensor data processing system according to example embodiments of the present disclosure;

Figure 1:
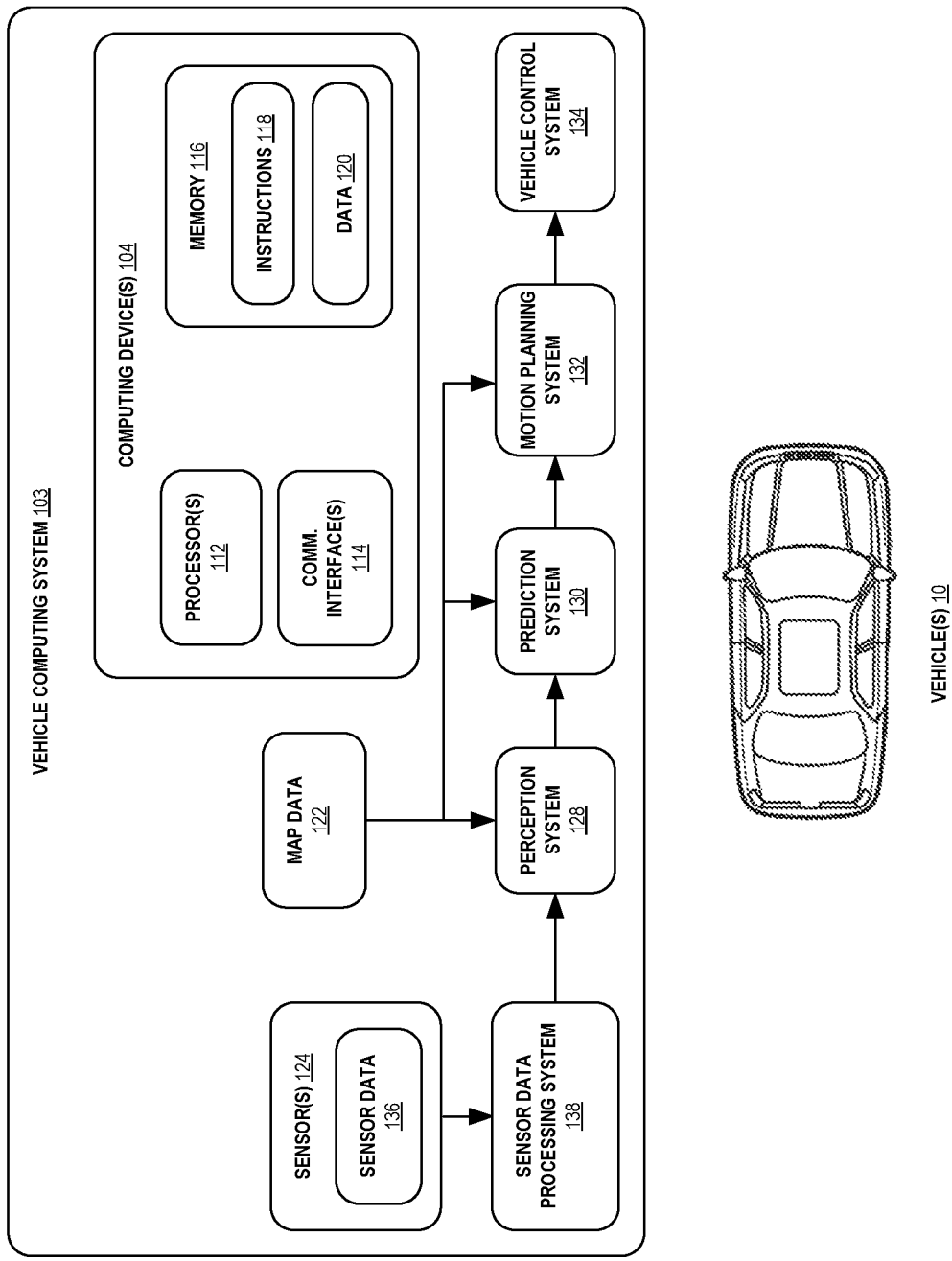
FIG. 1 depicts an example computing system according to example embodiments of the present disclosure.

Reference numerals that are repeated across plural figures are intended to identify the same components or features in various implementations.

DETAILED DESCRIPTION

Example aspects of the present disclosure are generally directed to streaming or pipelining sensor data for processing (e.g., image processing) using hardware, such as, for example a field programmable gate array. In particular, a sensor data processing system can be configured to receive sensor data (e.g., camera image data, LIDAR cloud data, etc.) descriptive of an environment proximate to one or more sensors, and output data associated with the perception of object(s) within the sensor data (e.g., object detections, object classifications, etc.). For instance, the sensor data processing system can be included within the onboard computing system of an autonomous vehicle. The sensor(s) can be located onboard the autonomous vehicle and can capture sensor data associated with the vehicles' surrounding environment. The sensor data processing system can include or leverage one or more machine-learned models that assist in detecting and/or classifying the object(s) within the sensor data (e.g., the pedestrian(s), vehicle(s), etc. within the vehicle's surroundings).

The sensor data processing system can be configured to process the sensor data in a streaming manner as increments (e.g., row(s) of pixels, etc.) of the sensor data (e.g., image data) are incrementally outputted by the sensor(s). In some implementations, the sensor data processing system can include a deep-learning accelerator (DLA) system. The DLA system can include one or more image processing pipelines and one or more machine learned models. The one or more image processing pipelines can pre-process the sensor data before the sensor data is input into one or more layers of the one or more machine learned models. For example, the DLA system can process each frame in the sensor data before sending the processed data to the one or more layers of the machine-learned model(s). The systems and methods of the present disclosure allow for the sensor data to be streamed such that the DLA system can process the sensor data as it becomes available from the sensor(s). The machine-learned model(s) and data pre-processor(s) described herein for detecting/classifying objects based on sensor data can be implemented on hardware such as, for example, a field programmable gate array (FPGA) device. In this way, the systems and methods of the present disclosure can greatly reduce the latency associated with sensor data processing, by allowing the hardware to analyze the sensor data on a streaming basis. Ultimately, this can lead to more efficient object perception and, for example, improve performance of an autonomous vehicle (e.g., via more accurate motion planning with respect to the perceived objects).

More particularly, an autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment.

The sensor system of an autonomous vehicle can include one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor(s) can be configured to collect sensor data that is descriptive of the environment proximate to the sensor(s). For example, the sensor data can include information that describes the location of objects within the surrounding environment of the autonomous vehicle. In some implementations, the sensor data can be obtained as a plurality of consecutive views, the sensor data at each view including information descriptive of a scene of an environment proximate to the autonomous vehicle, and the sensor data at each view corresponding to an image frame. In some implementations, the sensor data can be obtained at a plurality of consecutive cycles, the sensor data at each cycle including information descriptive of a 360 degree scene of an environment surrounding the autonomous vehicle, and the sensor data at each cycle corresponding to an image frame.

In some implementations, the autonomous vehicle can also include a memory device configured to store the sensor data as it becomes available from the sensor(s). For example, the memory device can include a rolling buffer to which sensor data is written at a plurality of successive increments within each view/cycle as increments of the sensor data are incrementally output by the sensor(s). In some implementations, each successive increment of the sensor data (e.g., image data) can include a row of pixels. In some implementations, each successive increment of the sensor data (e.g., LIDAR data) can include an angular slice of the 360 degree scene of an environment surrounding the autonomous vehicle.

The sensor data processing system can include hardware that is configured to process the sensor data in a streaming manner. For example, for implementations including an autonomous vehicle, the onboard vehicle computing system can include in a sensor data processing system (e.g., as at least a portion of the vehicle's autonomy system). The sensor data processing system can include one or more programmable circuit devices such as a field programmable gate array (FPGA) device. In some implementations, the one or more sensors can be coupled directly to the FPGA device via one or more image interface protocols (e.g., Low-Voltage Differential Signaling (LVDS)). In this way, rather than waiting for sensor data to be written to memory, the sensor data processing system can provide sensor data to the FPGA in successive increments as each increment of the sensor data is output by the sensor(s) and before the sensor data is stored in the memory device. In some implementations, the sensor(s) and the FPGA can be implemented on a single chip.

The sensor data processing system can be configured to receive sensor data that is incrementally output by a sensor as the sensor data becomes available. For instance, the sensor data processing system can obtain the sensor data in a streaming manner as the data is generated by the sensors, output by the sensors, made available in a memory, etc. The sensor data can include a plurality of increments of data and the sensor data processing system can incrementally receive each of the plurality of increments of data. By way of example, the sensor data can include camera image data and each increment of data can correspond to a row of pixels in the image data. The sensor data processing system can incrementally obtain each row of pixels (or a portion thereof) in a streaming manner. In another example, the sensor data can include LIDAR data that represents a 360 degree scene of an environment, and each increment of data can correspond to an angular slice of the 360 degree scene. The sensor data processing system can incrementally obtain each angular slice (or a portion thereof) in a streaming manner.

The sensor data processing system can be configured to implement one or more machine learned models, and to perform one or more inference operations (e.g., feature extraction, object detection, localization, classification, etc.) of the machine learned model(s) in a streaming manner, based on sensor data that is received in a streaming manner. For instance, as described herein, the sensor data processing system can include an FGPA device. The FPGA device or other programmable circuit device can include a plurality of logic blocks and interconnectors that can be programmed into specific configurations for implementing various operations. In some implementations, the operations can include, for example, image processing operations, inference operations, etc. The FPGA can be configured to include one or more processing pipelines for the one or more operations (e.g., one or more image processing pipelines, one or more inference operation pipelines for one or more layers of the machine-learned model(s), etc.).

The sensor data processing system (e.g., the FPGA device) can utilize, leverage, and/or otherwise implement one or more machine-learned models that are configured to perform the one or more inference operations. The machine-learned model(s) can be or can otherwise include various machine-learned models such as decision tree-based models, support vector machines, k-Nearest Neighbor models, neural networks (e.g., deep neural networks), or other multi-layer non-linear models. Example neural networks include feed-forward neural networks, recurrent neural networks (e.g., long short-term memory recurrent neural networks), or other forms of neural networks. Example machine-learned models can include, for instance, MobileNet and Resnet. The sensor data processing system can schedule portions of the inference operation(s) of the machine-learned model(s) to occur in-line with sensor data received in a streaming manner.

In some implementations, the DLA system can perform various mathematical operations (e.g., convolutions, multiplications, additions, etc.) on the sensor data. The mathematical operations can be a part of an image processing operation to pre-process the sensor data before the sensor data is input into one or more layers of the one or more machine learned models. The pre-processed sensor data can be input into the machine learned model(s) so that the model(s) can perform the inference operation(s) (e.g., to detect/classify objects that are represented by the sensor data). The DLA system can pre-process each portion of the sensor data before the sensor data is input into the machine learned model(s). In some implementations, the DLA system can pre-process a first portion of the sensor data and input the pre-processed first portion into one or more layers of the machine-learned model(s). The DLA system can pre-process a second portion of the sensor data and input the pre-processed second portion into one or more layers of the machine-learned models(s), while the machine-learned model(s) perform inference operation(s) on the pre-processed first portion. In some implementations, the DLA system can determine an output of a first layer of a machine-learned model (e.g., based on a pre-processed first portion of the sensor data) and provide the output of the first layer of the machine-learned model as an input into a second layer of the machine-learned model, while the DLA system provides the pre-processed second portion of the sensor data as an input into the first layer of the machine-learned model. In this way, the pre-processor can reduce a latency associated with an object detection/classification task.

As an example, an object detection machine-learned model can include a convolutional neural network with an input layer that can receive input data (e.g., sensor data corresponding to an image frame and/or an increment of the sensor data) and an output layer that can output a detection/classification of one or more objects indicated within the input data. The machine-learned model can include one or more intermediate layers in the convolutional neural network to perform various inference operations on the input data. The inference operations can include filtering an output of a previous layer (e.g. input layer or intermediate layer) using, for example, 3×3×32 size filters, 3×3×M depthwise filters, 1×1×N pointwise filters, etc. In some implementations, the input data can be pre-processed input data (e.g., output by one or more image processing pipelines). In this case, the machine-learned model can be configured to receive pre-processed input data and output a detection/classification of one or more objects indicated within the pre-processed input data. In some implementations, the sensor data processing system can include information indicative of a filter width, filter height, filter group (for expressing depthwise filters), padding, and stride associated with each layer of the machine-learned model(s).

In some implementations, the sensor data processing system can be configured to determine how many increments of data are needed for a particular inference operation associated with a particular layer (e.g., CNN layer) in a machine-learned model in order to produce one increment of that layer's output. For example, the sensor data processing system can determine a number of increments of data associated with a first convolution operation that is performed by a first CNN layer (e.g., that three rows of pixels are needed for the first convolution operation). Upon receipt of a first portion of sensor data that corresponds to the number of increments associated with the first convolution operation (e.g., upon receipt of at least the three rows of pixels), the sensor data processing system can input the first portion of sensor data into the first CNN layer and determine an incremental output of the first CNN layer. The sensor data processing system can determine a number of increments of data associated with a second convolution operation that is performed by a second CNN layer, and upon determining an incremental output of the first CNN layer that corresponds to the number of increments associated with the second convolution operation, the sensor data processing system can input the output of the first CNN layer into the second CNN layer to determine an incremental output of the second CNN layer.

This process can continue as new increments of sensor data are streamed to the sensor data processing system. The sensor data processing system can process the streaming sensor data (e.g., perform one or more convolution, normalization, activation, etc. operation(s)) in a cascading manner. The FPGA can be configured to include one or more first image processing pipelines to pre-process data input, one or more second image processing pipelines to implement the first CNN layer (e.g., for the first convolution operation), one or more third image processing pipelines to implement the second CNN layer (e.g., for the second convolution operation), etc. The one or more convolution operations can be performed by the corresponding CNN layer simultaneously or at least concurrently.

As an example, the FPGA can be configured to implement a first convolution operation. The first convolution operation can include extraction of a first set of one or more features indicative of the state of an object within the surrounding environment of the sensor(s) (e.g., the location, speed, etc. of the object). The first convolution operation can be configured to operate on a subset of the image data consisting of, for example, three consecutive rows of an image frame. The FPGA can be configured to include a first convolution pipeline that corresponds to the first convolution operation. In particular, the first convolution pipeline can include three processing lanes for receiving three successive increments of the sensor data. The sensor data processing system can cascade successive increments of sensor data across the three processing lanes. The sensor data processing system can obtain a first increment of sensor data and provide the first increment to the first processing lane; obtain a second increment of sensor data, cascade the first processing increment to the second lane, and provide the second increment to the first processing lane; obtain a third increment of sensor data, cascade the first increment from the second to the third processing lane, cascade the second increment from the first to the second processing lane, and provide the third increment to the first processing lane. The sensor data processing system can obtain and provide a fourth increment of sensor data to the first processing lane, cascade the third increment to the second processing lane, and cascade the second increment to the third processing lane. In this way, the sensor data processing system can process a portion of a frame in the sensor data. Alternatively, the sensor data processing system can wait until it can obtain three successive increments of sensor data and provide the three successive increments at once to the three processing lanes. For each subsequent successive increment, the sensor data processing system can cascade the successive increment of sensor data through the processing lanes.

As another example, the FPGA can be configured to implement a second convolution operation. The second convolution operation can include extracting a size/footprint of an object within the sensor data. The second convolution operation can be configured to operate on a 5×5 pixel grid subset of the sensor data (e.g., image data). The FPGA can be configured to include a second convolution pipeline that corresponds to the second convolution operation. In particular, the second convolution pipeline can include five processing lanes for receiving successive increments of sensor data. The sensor data processing system can cascade successive increments of sensor data across the five processing lanes. The FPGA can perform the second convolution operation on a subset of the sensor data consisting of the five successive increments of sensor data provided to the five processing lanes. When the sensor data processing system cascades a new successive increment of sensor data into the second convolution pipeline, the FPGA can perform the second convolution operation on a successive subset of the sensor data including the new successive increment.

As another example, the FPGA can be configured to implement both the first convolution operation and the second convolution operation. Upon receipt of a first portion of sensor data that corresponds to the number of increments associated with the first convolution operation (e.g., upon receipt of at least the third row of pixels), the sensor data processing system can input the first portion of the sensor data into a machine-learned model(s), and upon receipt of a second portion of sensor data that corresponds to the number of increments associated with the second convolution operation (e.g., upon receipt of at least the fifth row of pixels), the sensor data processing system can input the second portion of the sensor data into machine-learned model(s). In some implementations, the first portion of sensor data and the second portion of sensor data can include one or more increments of sensor data (e.g., one or more rows of pixels) in common. For example, when the sensor data processing system obtains an increment of sensor data corresponding to a sixth row of pixels, then the sensor data processing system can simultaneously provide the increment of sensor data to the first convolution pipeline and the second convolution pipeline.

Although some FPGA device examples are described herein as including separate first and second convolution pipelines, it should be appreciated that other implementations could include all features in a single convolution pipeline or features split across different combinations of pipelines than those explicitly depicted and discussed.

In some implementations, the FPGA can be configured to include one or more convolution pipelines that are associated with one or more convolution operations. A breadth and/or depth of the convolution pipeline(s) can be based on an availability of sensor data. For example, if the sensor data processing system receives each increment of sensor data at relatively short intervals, then the FPGA can be configured to include convolution pipeline(s) that are longer in breadth and/or shorter in depth. Alternatively, if the sensor data processing system receives each increment of sensor data at relatively long intervals, then the FPGA can be configured to include convolution pipeline(s) that are shorter in breadth and/or longer in depth. As another example, the breadth and/or depth of the convolution pipeline(s) can be based on a target latency such as, for example, between 25 milliseconds and 50 milliseconds from a first subsample of sensor data availability. If the FPGA is configured based on the target latency of 50 milliseconds, then the convolution operations can be spread out with respect to a configuration based on the target latency of 25 milliseconds, so as to minimize a bandwidth for processing/pre-processing the sensor data.

In some implementations, the machine-learned model(s) can process input data (e.g., sensor data corresponding to an image frame) and output a detection/classification of one or more objects indicated within the input data, by switching between different layers of the machine-learned model(s) in order to keep one or more inference operation pipelines full. The machine-learned model(s) can keep as many layers worth of parameters as possible on-chip to minimize accesses to external memory when switching between layers, thus reducing the requirements for external memory bandwidth. In some implementations, the sensor data processing system can schedule various types of operations to facilitate switching between different layers of the machine-learned model(s). The operations can include, for example, loading a parameter (e.g., by moving data associated with a parameter from DRAM to parameter-designated RAM), loading a feature (e.g., by moving data associated with a feature from DRAM to feature-designated RAM), storing a feature (e.g., by moving data associated with a feature from feature-designated RAM to DRAM), and an array command to obtain information associated with a filter size, filter-designated RAM location, feature size, feature-designated RAM location, and other information. The sensor data processing system can schedule the operations at a granularity associated with a single row of an image frame, a tile of an image frame, or any other suitable level of granularity.

In some implementations, the sensor data processing system can be configured as an unrolled network that includes independent multipliers (e.g., multiplier-accumulator units (MACs)) for each of one or more convolution operations. The MACs can be distributed so as to keep the layers of the machine-learned model(s) equally busy. The sensor data processing system can also include independent layer input/output memories between each layer of the machine-learned model(s).

In some implementations, the DLA system can be configured as a single large multiplier array that is structured to perform well for all layer types to maintain efficiency. In this case, the sensor data processing system can include a parameter cache that allows for quickly switching the multiplier array between operations on different layers.

In some implementations, the sensor data processing system can process the sensor data in a variety of manners. For example, the sensor data processing system can tile the sensor data horizontally, vertically, or both horizontally and vertically. If the sensor data processing system is configured to tile the sensor data horizontally, then the sensor data processing system can divide the sensor data corresponding to an image frame into a plurality of horizontal tiles that each correspond to one or more rows in the image frame. The sensor data processing system can process/pre-process each tile of the sensor data when a readout of the sensor data is complete past a last row of the tile. The sensor data processing system can perform operations for multiple network layers of the machine-learned model(s) within a single tile. When processing the sensor data in this way, intermediate layer memory can be swapped in/out prior to (or while) operating on a horizontal tile, and the last rows of each tile can be saved/restored.

If the sensor data processing system is configured to tile the sensor data vertically, then the sensor data processing system can divide the sensor data corresponding to an image frame into a plurality of vertical tiles that each correspond to one or more columns of the image frame. The sensor data processing system can process/pre-process each tile of the sensor data when a readout of the sensor data is complete past a last row of the tile. The sensor data processing system can perform operations for multiple network layers of the machine-learned model(s) within a single tile. When processing the sensor data in this way, a columnar portion of intermediate memory can be swapped in/out prior to (or while) operating on a vertical tile, and the last columns of each layer can be saved/restored. In some implementations, the sensor data processing system can obtain a desired horizontal tiling (e.g., from a user) and determine vertical tiling for sensor data based on a hardware RAM size available for storing parameter associated with processing/pre-processing the sensor data. The sensor data processing system can schedule operations to iterate through each new row of sensor data based on the desired horizontal tiling and determined vertical tiling.

If the sensor data processing system is configured to tile the sensor data both vertically and horizontally (e.g., combined tiling), then the sensor data processing system can divide the sensor data corresponding to an image frame into a plurality of tiles that each correspond to a portion of the image frame. In particular, the sensor data processing system can divide the sensor data into a plurality of combined tiles that are each associated with a number of rows and number of columns of the image frame. The sensor data processing system can operate on the combined tiles in row-major order (for image pipelining). When processing the sensor data in this way, intermediate layer memory can be swapped in/out prior to (or while) operating on a combined tile, and the last rows and columns of each layer's buffer can be saved/restored.

The sensor data processing system can process/pre-process each tile of the sensor data when a readout of the sensor data is complete past a last row of the tile. The sensor data processing system can perform operations for multiple network layers of the machine-learned model(s) within a single tile. When processing the sensor data in this way, a columnar portion of intermediate memory can be swapped in/out prior to (or while) operating on a vertical tile, and the last columns of each layer can be saved/restored.

The sensor data processing system can obtain an output of the machine-learned model(s) that includes a classification of one or more objects indicated within the sensor data. For instance, based on the process described above for analyzing the sensor data in a streaming manner, the machine-learned model(s) can detect the presence of an object within the sensor data and classify the state of that object. An object can be classified, for example, as static or dynamic as well as the type of object (e.g., tree, retaining wall, pedestrian, vehicle, etc.). Such object detection and classification can be performed at a much greater speed due to the real-time processing of the streaming sensor data as it becomes available.

Moreover, the output can be utilized by an autonomous vehicle for better motion control. For example, an autonomous vehicle can be controlled to navigate through its environment based at least in part on the classification of the one or more objects indicated within the sensor data. This can include the generation and implementation of an improved motion plan that is formulated based on faster object classifications and, thus, helping the autonomous vehicle react more appropriate to the objects around it (e.g., yield, pass, stop, etc.).

The systems and methods described herein may provide a number of technical effects and benefits. For instance, sensor data processing systems and methods that implement object detection/classification using an FPGA device (or ASIC device) coupled to one or more cameras can generally provide faster image processing and reduce potential processing latencies. Sensor data processing with an FPGA device corresponding to a single programmable chip coupled to the one or more cameras helps to greatly improve the processing speed for inference operations (e.g., feature extraction, object detection and/or other image processing aspects as disclosed herein). High-throughput on-chip memories and data pipelining associated with FPGA device implementation allows for inference operations to occur in parallel with sensor data being read out from an image sensor, thus making the disclosed sensor data processing systems and methods uniquely capable of real-time or near real-time object detection at fast enough speeds to advantageously affect the behavior of an autonomous vehicle.

More particularly, utilization of an FPGA device configured to receive streamlined or pipelined successive increments of sensor data can provide system functionality to perform a vast number of inference operations in parallel with reduced latency. In some implementations, a read out of sensor data corresponding to a single image frame from a sensor into memory can cost 30-50 milliseconds of time. By enabling the sensor data processing system to process a portion of the sensor data in increments, the FPGA can begin inference operations on the sensor data after approximately 5 milliseconds into the read out. In this way, a parallelism of the sensor data processing system can be maximized with respect to the sensor data being generated by at least one sensor. Additionally, by directly coupling the sensors to the FPGA device, an amount of memory and a memory bandwidth used to store intermediate outputs can be reduced. Furthermore, since the inference operations are content independent, the systems and methods of the present disclosure can be used to process a variety of different sensor data (e.g., other than sensor data associated with an environment proximate to an autonomous vehicle).

The disclosed improvements to image processing can be particularly advantageous for use in conjunction with vehicle computing systems for autonomous vehicles. Because vehicle computing systems for autonomous vehicles are tasked with repeatedly detecting and analyzing objects in image data for localization and classification of objects of interest including other vehicles, cyclists, pedestrians, traffic changes, and the like, and then determining necessary responses to such objects of interest, enhanced image processing can lead to faster and more accurate object detection and characterization. Improved object detection and classification can have a direct effect on the provision of safer and smoother automated control of vehicle systems and improved overall performance of autonomous vehicles.

The systems and methods described herein may also provide resulting improvements to computing technology tasked with image classification and object detection. Improvements in the speed and accuracy of object detection can directly improve operational speed and reduce processing requirements for vehicle computing systems, ultimately resulting in more efficient vehicle control. By providing an sensor data processing system that includes an FPGA device (or ASIC device) configured to implement image transformation and object detection, valuable computing resources within a vehicle control system that would have otherwise been needed for such tasks can be reserved for other tasks such as object motion prediction, route determination, autonomous vehicle control, and the like.

With reference now to the FIGS., example embodiments of the present disclosure will be discussed in further detail.

FIG. 1 depicts an example computing system according to example embodiments of the present disclosure. The computing system 100 illustrated in FIG. 1 is provided as an example only. The components, systems, connections, and/or other aspects illustrated in FIG. 1 are optional and are provided as examples of what is possible, but not required, to implement the present disclosure. The computing system 100 can include one or more vehicles 10. Vehicle(s) 10 can be a ground-based autonomous vehicle (e.g., car, truck, bus), an air-based autonomous vehicle (e.g., airplane, drone, helicopter, or other aircraft), or other types of vehicles (e.g., boat, ship, or other watercraft). Vehicle(s) 10 can be an autonomous vehicle that can drive, navigate, operate, etc. with minimal and/or no interaction from a human driver, or vehicle(s) 10 can be manually controlled by a human operator. Vehicle(s) 10 can each be associated with a vehicle computing system 103.

Vehicle(s) 10 can be capable of sensing its environment, navigating its environment with minimal or no human input, and/or the like. Vehicle(s) 10 can include a vehicle computing system 103. Computing system 103 can assist in controlling vehicle(s) 10. For example, computing system 103 can receive data generated by one or more sensors 124, attempt to comprehend an environment surrounding vehicle(s) 10 by performing various processing techniques on the data generated by sensor(s) 124, generate, determine, select, and/or the like a motion plan for navigating vehicle(s) 10 through, within, and/or the like such surrounding environment, and/or the like. Computing system 103 can interface with one or more vehicle controls to operate vehicle(s) 10 (e.g., in accordance with the motion plan, and/or the like).

Computing system 103 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable vehicle(s) 10 (e.g., computing system 103, computing device(s) 104, and/or the like) to communicate with one or more computing systems, computing devices, and/or the like distinct from vehicle(s) 10. Memory 116 can include (e.g., store, and/or the like) instructions 118 and data 120. When executed by processor(s) 112, instructions 118 can cause vehicle(s) 10 (e.g., computing system 103, computing device(s) 104, and/or the like) to perform one or more operations, functions, and/or the like described herein. Data 120 can include, represent, and/or the like information associated with such operations, functions, and/or the like, and data generated by sensor(s) 124, and/or the like.

Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate sensor data 136 that is descriptive of the environment proximate to the sensor(s), including information that describes one or more locations, velocities, vectors, and/or the like of objects in the environment surrounding vehicle(s) 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s). In some implementations, sensor(s) 124 can be configured to incrementally output sensor data 136 as the data is generated. For example, sensor(s) 124 can output sensor data 136 in a streaming manner.

Sensor data processing system 138 can receive sensor data 136 from sensor(s) 124, which can be coupled to or otherwise included within vehicle(s) 10. Sensor data processing system can incrementally receive sensor data 136 as the data is generated by sensor(s) 124. For example, sensor data processing system can receive and process sensor data 136 in a streaming manner. Sensor data processing system can include one or more programmable circuit devices such as a field programmable gate array (FPGA) device. In some implementations, sensor(s) 124 can be coupled directly to the FPGA device via one or more image interface protocols (e.g., Low-Voltage Differential Signaling (LVDS)). In this way, rather than waiting for sensor data 136 to be written to a memory, sensor data processing system can provide sensor data 136 to the FPGA in successive increments as each increment of sensor data 136 is output by sensor(s) 124 and before sensor data 136 is stored in the memory. In some implementations, sensor(s) 124 and the FPGA can be implemented on a single chip.

Sensor data processing system 138 can be configured to receive sensor data 136 incrementally output by sensor(s) 124 as sensor data 136 becomes available. For instance, sensor data processing system can obtain sensor data 136 in a streaming manner as the data is generated by sensors, output by sensors, made available in a memory, etc. By way of example, sensor data 136 can include image data generated by one or more cameras, and each increment of sensor data 136 can correspond to a row of pixels (or a portion thereof) in the image data. The sensor data processing system can incrementally obtain each row of pixels (or a portion thereof) in a streaming manner. In another example, the sensor data 136 can include LIDAR data that represents a 360 degree scene of an environment, and each increment of data can correspond to an angular slice of the 360 degree scene (or a portion thereof). The sensor data processing system can incrementally obtain each angular slice (or a portion thereof) in a streaming manner.

Sensor data processing system 138 (e.g., the FPGA device) can utilize, leverage, and/or otherwise implement one or more machine-learned models that are configured to perform one or more inference operations (e.g., feature extraction, object detection, localization, classification, convolution, etc.). The machine-learned model(s) can be or can otherwise include various machine-learned models such as decision tree-based models, support vector machines, k-Nearest Neighbor models, neural networks (e.g., deep neural networks), or other multi-layer non-linear models. Example neural networks include feed-forward neural networks, recurrent neural networks (e.g., long short-term memory recurrent neural networks), or other forms of neural networks. The sensor data processing system 138 can perform computations for the machine-learned model(s) on a portion of sensor data 136 as the data is received in a steaming manner. In some implementations, the machine-learned model(s) can detect/classify objects that are represented by one or more extracted feature(s) from sensor data 136. This can be utilized by, for example, the perception system of the vehicle(s) 10.

Perception system 128 can retrieve, obtain, and/or the like, map data 122, which can provide information about an environment surrounding vehicle(s) 10. For example, map data 122 can provide information regarding: the identity and location of different travel ways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist computing system 103 in comprehending, perceiving, and/or the like an environment surrounding vehicle(s) 10, its relationship thereto, and/or the like.

Perception system 128 can (e.g., based at least in part on data received from sensor data processing system 138, map data 122, and/or the like) identify one or more objects proximate to vehicle(s) 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for vehicle(s) 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for vehicle(s) 10 that it determines (e.g., based at least in part on one or more operation parameters, and/or the like) best navigates vehicle(s) 10 relative to the object(s). Motion-planning system 132 can provide the motion plan to vehicle control system 134, which can directly and/or indirectly control vehicle(s) 10 via the one or more vehicle controls (e.g., one or more actuators, devices, and/or the like that control gas, power flow, steering, braking, and/or the like) in accordance with the motion plan.

Perception system 128, prediction system 130, motion-planning system 132, and/or vehicle control system 134 can include logic utilized to provide functionality described herein. Perception system 128, prediction system 130, motion-planning system 132, and/or vehicle control system 134 can be implemented in hardware (e.g., circuitry, and/or the like), firmware, software configured to control one or more processors, one or more combinations thereof, and/or the like. For example, instructions 118, when executed by processor(s) 112, can cause vehicle(s) 10 (e.g., computing system 103, computing device(s) 104, and/or the like) to implement functionality of perception system 128, prediction system 130, motion-planning system 132, and/or vehicle-control system 134 described herein.

Figure 2C:
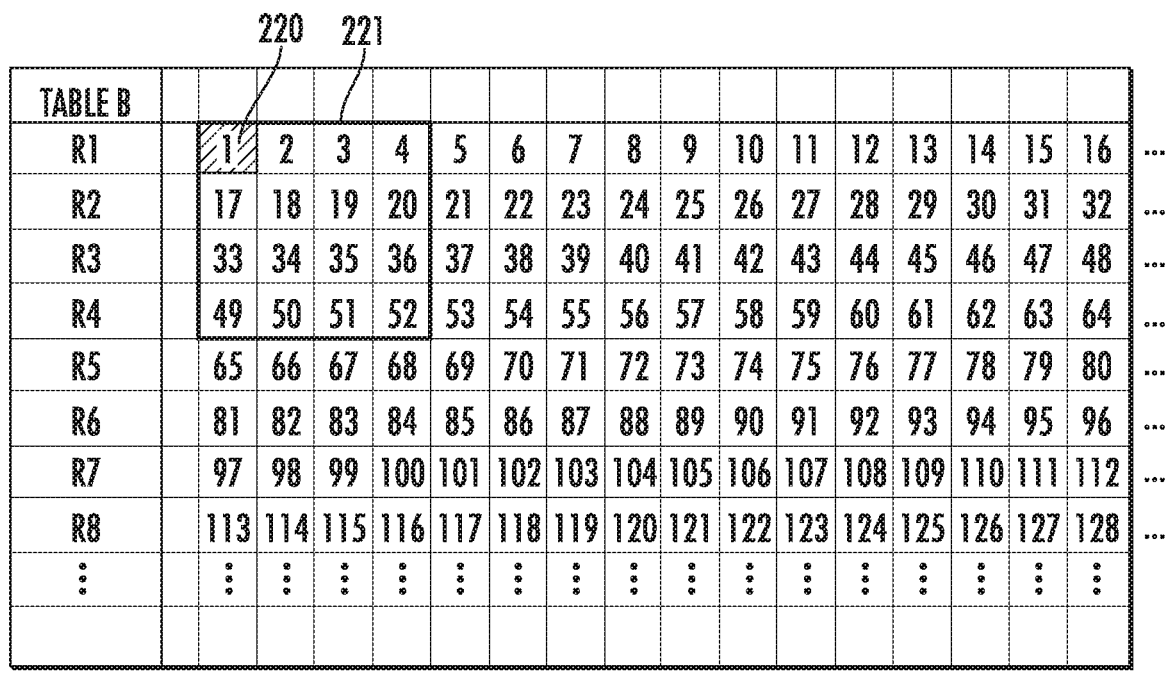

FIG. 2A-2E depict example inference operation pipelines of a sensor data processing system according to example embodiments of the present disclosure. In some implementations, sensor(s) 124 can generate sensor data 136 consisting of one or more image frames. The image frame(s) can include a plurality of pixels arranged in a plurality of rows. The plurality of pixels in the image frame(s) can each be associated with one or more attributes (e.g., RGB color data, luminosity data, etc.). As shown in FIG. 2B for example, sensor data 136 can include an image frame with 48 rows and 48 pixels in each row (total of 2304 pixels). Sensor(s) 124 can incrementally output sensor data 136 in row-major order (e.g. row 1, row 2, row 3, ..., row 48). In some implementations, sensor(s) 124 can incrementally output a subset of pixels from each row of the image frame(s) (e.g., pixels 1-9, 10-18, 19-27, etc.).

Referring to FIG. 2A, sensor(s) 124 can output sensor data 136 incrementally, and the sensor data processing system 138 can receive and buffer the sensor data 136 in external and/or on-chip memory, such that at any particular point in time it may access any of the rows received up to that point in time. At $t_1$, after sensor data processing system 138 receives sensor data corresponding to row 3, the sensor data processing system 138 can access sensor data 146 indicative of rows 1-3 (e.g., pixels 1-144); at $t_2$, after sensor data processing system 138 receives sensor data corresponding to row 4, the sensor data processing system 138 can access data indicative of rows 2-4; and at $t_3$, after sensor data processing system 138 receives sensor data corresponding to row 5, the sensor data processing system 138 can access data indicative of rows 3-5. In this way, sensor data processing system 138 can continue to incrementally access sensor data 136 as the data is output by sensor(s) 124 in increments of 3 rows.

In some implementations, sensor data processing system 138 can include a first inference operation pipeline that is configured to operate on a 3×3 pixel grid subset of the image frame in sensor data 136. At $t_1$, the first inference operation pipeline can process rows 1-3 of sensor data 136. The first inference operation pipeline can operate on a 3×3 pixel grid subset of rows 1-3 for each consecutive 3×3 pixel grid subset, and output the results. For example, as shown in FIG. 2B, the first inference operation pipeline can operate on 3×3 pixel grid 211 consisting of pixels 1-3, 49-51, 97-99, and as shown in FIG. 2C, the first inference operation pipeline can output the result as the first element 220 in table B. In this way, the first inference operation pipeline can operate on a 3×3 pixel grid consisting of pixels 2-4, 50-52, 98-100, a 3×3 pixel grid consisting of pixels 3-5, 51-53, 99-101, etc. to perform an operation on each consecutive 3×3 pixel grid subset of rows 1-3 of sensor data 136, and output the results as the elements in the first row of table B. Similarly, at $t_2$, the first inference operation pipeline can operate on each consecutive 3×3 pixel grid subset of rows 2-4 of sensor data 136, and output the results as the elements in the second row of table B. The first inference operation pipeline can continue to process each consecutive set of 3 rows of sensor data 136 received by the sensor data processing system 138.

Figures 2D, 2E:
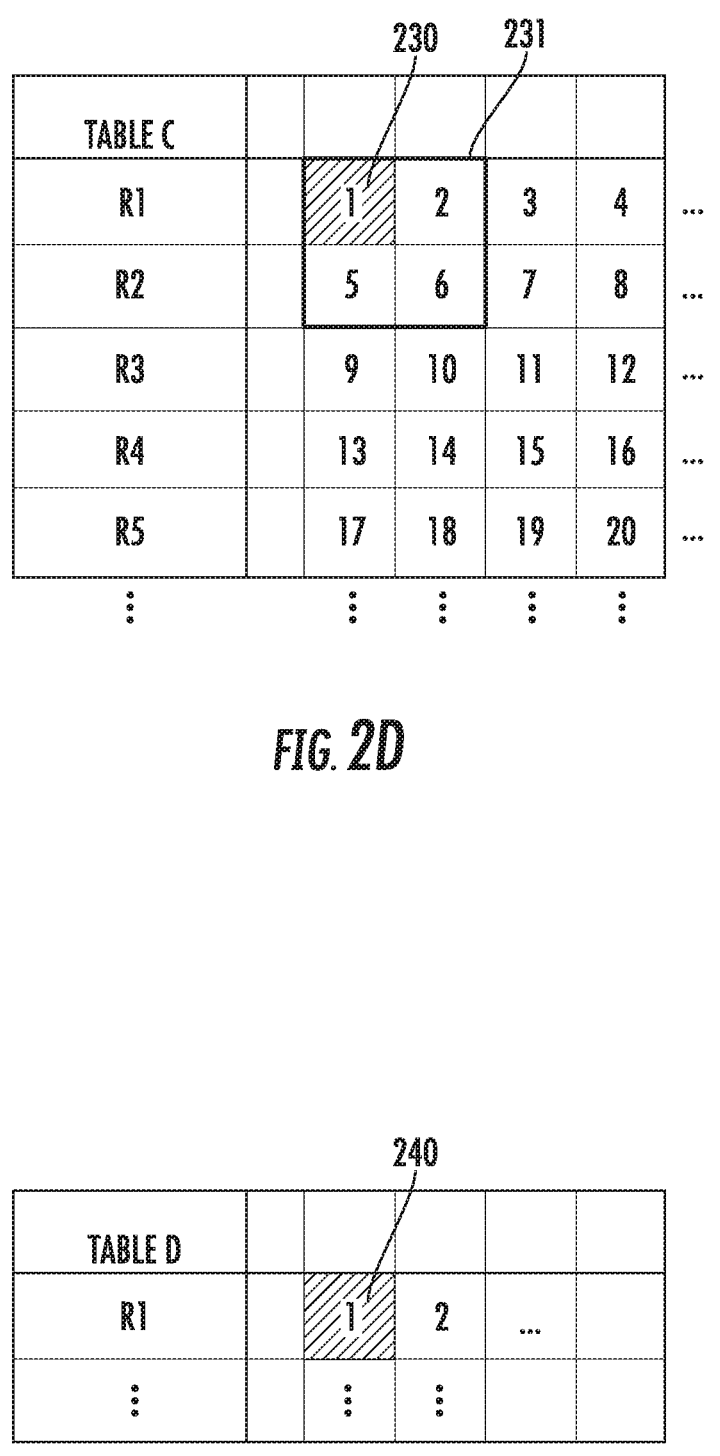

In some implementations, sensor data processing system 138 can include a second inference operation pipeline that is configured to operate on a 4×4 element grid subset of the output from the first inference operation pipeline. For example, the second inference operation pipeline can operate on a 4×4 element grid subset of the rows in table B for each consecutive 4×4 element grid subset, and output the results. Referring to FIG. 2A at $t_4$, the first inference operation pipeline can operate on rows 4-6 of sensor data 136 and output the results as the elements in the fourth row of table B. As shown in FIG. 2C, the second inference operation pipeline can operate on 4×4 element grid 221 consisting of elements 1-4, 17-20, 33-36, 49-52, and as shown in FIG. 2D, the second inference operation pipeline can output the result as the first element 230 in table C. In this way, the second inference operation pipeline can operate on a 4×4 element grid consisting of elements 2-5, 18-21, 34-37, 50-53, etc. to perform an operation on each consecutive 4×4 element grid subset of rows 1-4 of table B, and output the results as the elements in the first row of table C. Similarly, at $t_5$, the first inference operation pipeline can operate on each consecutive 3×3 pixel grid subset of rows 5-7 of sensor data 136, and output the results as the elements in the fifth row of table B (shown in FIG. 2C). The second inference operation pipeline can operate on each consecutive 4×4 element grid subset of rows 2-5 of table B, and output the results as the elements in the second row of table C. The second inference operation pipeline can continue to process each consecutive set of 4 rows as each row is output by the first inference operation pipeline in table B.

In some implementations, sensor data processing system 138 can include a third inference operation pipeline that is configured to operate on a 2×2 element grid subset of the output from the second inference operation pipeline. For example, the third inference operation pipeline can operate on a 2×2 element grid subset of the rows in table C for each consecutive 2×2 element grid subset, and output the results. Referring to FIG. 2A at $t_5$, the second inference operation pipeline can operate on rows 5-7 of table B, and output the results as the elements in the second row of table C. As shown in FIG. 2D, the third inference operation pipeline can operate on 2×2 element grid 231 consisting of elements 1-2, 5-6, and as shown in FIG. 2E, the third inference operation pipeline can output the result of as the first element 240 in table D. In this way, the third inference operation pipeline can perform an operation on each consecutive 2×2 element grid subset of rows 1-2 of table C, and output the results as the elements in the first row of table D. The third inference operation pipeline can continue to process each consecutive set of 2 rows as each row is output by the second inference operation pipeline in table C.

In some implementations, the first inference operation pipeline, second inference operation pipeline, and third inference operation pipeline can correspond to a first, second, and third image processing pipeline, respectively. The sensor data processing system 138 can input the results of the first inference operation pipeline into a first layer of a machine-learned model. For example, the sensor data processing system 138 can incrementally input the results of the first inference operation pipeline as the results are output by the first inference operation pipeline. Similarly, sensor data processing system 138 can incrementally input the results of the second inference operation pipeline into a second layer of the machine-learned model, and incrementally input the results of the third inference operation pipeline into a third layer of the machine-learned model. Sensor data processing system 138 can implement the machine-learned model such that the model can incrementally process the incremental input to perform object detection/classification on the image frame(s) in sensor data 136.

In some implementations, the first inference operation pipeline, second inference operation pipeline, and third inference operation pipeline can correspond to a first, second, and third layer of a machine-learned model, respectively. Sensor data processing system 138 can implement the machine-learned model such that the model can incrementally process the incremental input to each layer to perform object detection/classification on the image frame(s) in sensor data 136.

Figure 3:
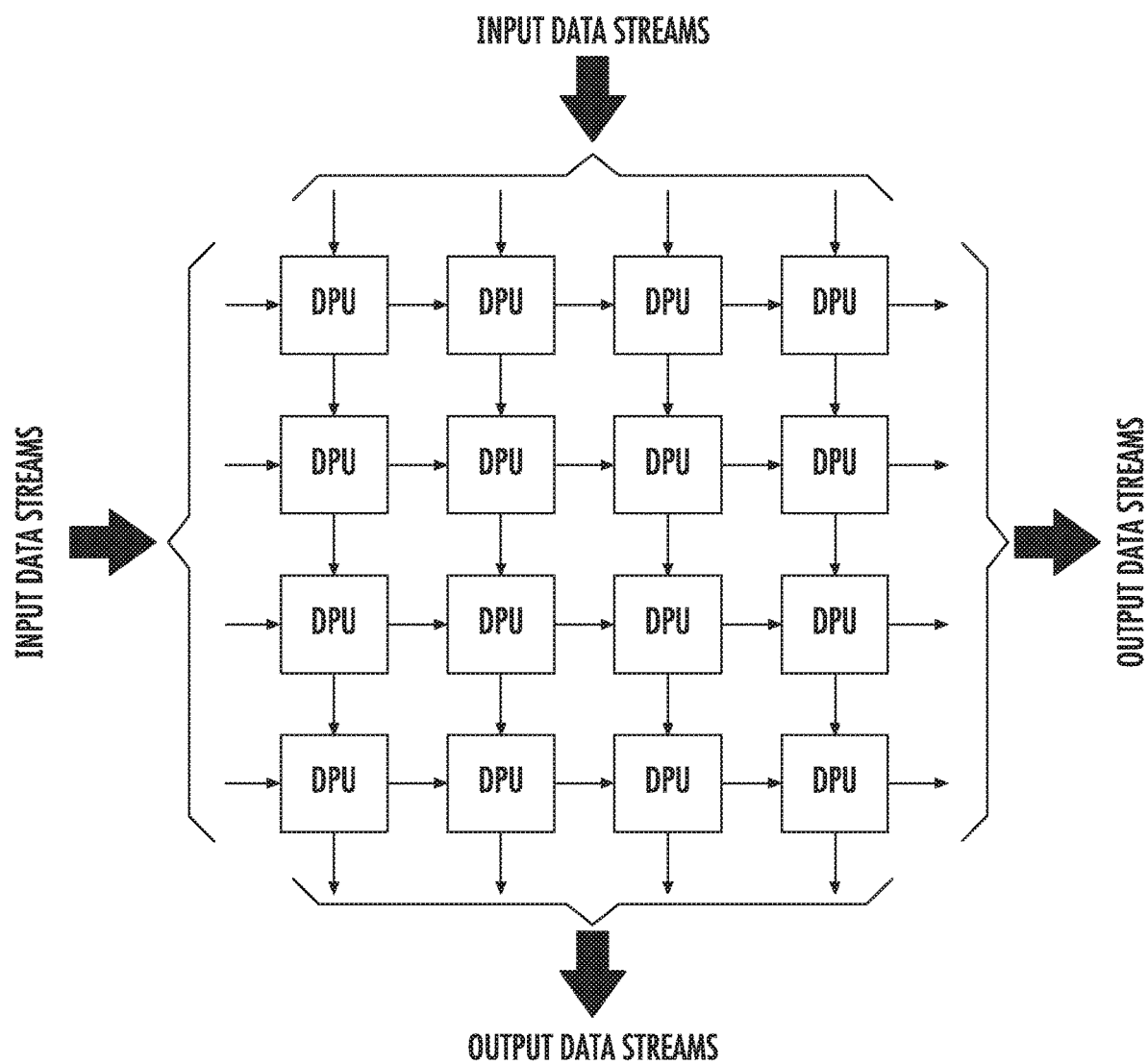
FIG. 3 illustrates an example configuration of a sensor data processing system according to example embodiments of the present disclosure.

FIG. 3 illustrates an example configuration of a sensor data processing system according to example embodiments of the present disclosure. As shown in FIG. 3, sensor data processing system 138 can include a plurality of data processing units (e.g., logic blocks) implemented as systolic array. Each data processing unit can independently compute a partial result based on data received from its upstream neighbors, store the result and pass it downstream. Sensor data processing system 138 can use one or more systolic arrays to implement one or more inference operation pipelines, such as the first, second, and third inference operation pipelines shown in FIG. 2A. In some implementations, sensor data processing system 138 can use a single systolic array for one or more operations in an inference operation pipeline and/or one or more operations from a plurality of different inference operation pipelines. In some implementations, sensor data processing system 138 can use one or more various data processing units that can be implemented as one or more different processing structures (e.g., other than a systolic array). Referring to FIG. 2A at $t_1$, sensor data processing system 138 can use a first systolic array to perform an operation on a first 3×3 pixel grid subset of rows 1-3, a second systolic array to perform an operation on a second 3×3 pixel grid subset of rows 1-3, a third systolic array to perform an operation on a third 3×3 pixel grid subset of rows 1-3, and a forth systolic array to perform an operation on a fourth 3×3 pixel grid subset of rows 1-3. Sensor data processing system 138 can store the output of the systolic arrays and reuse the arrays to perform an operation on a fifth through eight pixel grid subset of rows 1-3, and so on. Similarly, at $t_4$, sensor data processing system 138 can use the first, second, third, and fourth systolic arrays to perform operations on rows 13-15 of sensor data 136, store the outputs, and reuse the arrays to perform operations on a first through fourth element grid subset of table B. In this way, sensor data processing system 138 can occupy the systolic arrays to perform useful operations while waiting to receive additional sensor data 136.

Figure 4:
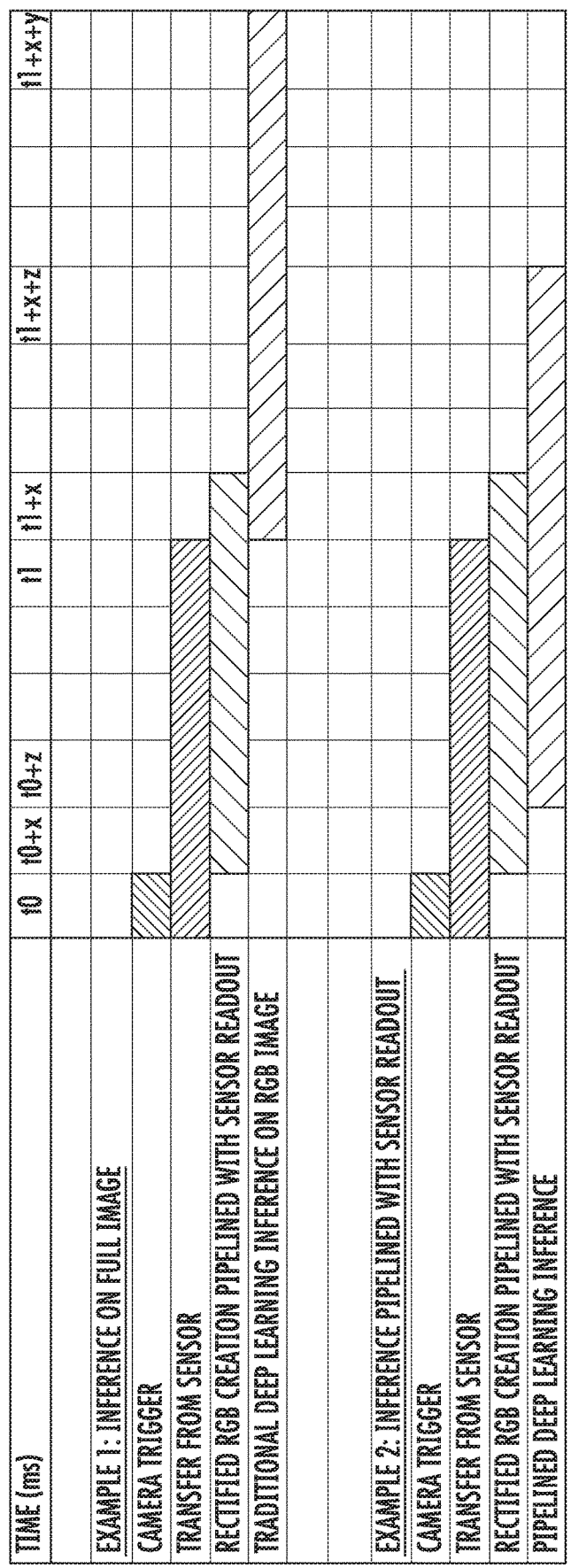
FIG. 4 depicts an example pipelined deep learning inference according to example embodiments of the present disclosure.

FIG. 4 depicts an example pipelined deep learning inference according to example embodiments of the present disclosure. As shown in FIG. 4 with respect to Example 1 (e.g., a standard inference on a full image), at $t_0$ a camera trigger can cause sensor(s) 124 to generate sensor data 136 and transfer the data to a memory. At $t_1$, a full image frame of sensor data 136 has been transferred to the memory from sensor(s) 124. At $t_0+x$, a rectified RGB image can be created based on sensor data 136 as the data is transferred to memory. At $t_1+x$, the creation of the rectified RGB image is completed, and the completed rectified RGB image is input into a traditional deep learning inference (e.g., machine-learned model). The traditional deep learning inference can process the completed rectified RGB image, and at $t_1+x+y$, the traditional deep learning inference can output one or more results.

As shown in FIG. 4 with respect to Example 2 (e.g., inference pipelined with sensor readout according to the present disclosure), at $t_0$ a camera trigger can cause sensor(s) 124 to generate sensor data 136, and input sensor data 136 into a rectified RGB pipeline. The rectified RGB pipeline can wait until a minimum amount of sensor data 136 is received from sensor(s) 124, and at $t_0+x$ the rectified RGB pipeline can begin processing sensor data 136 and incrementally output the results as an input to the pipelined deep learning inference (e.g., pipelined machine-learned model). The pipelined deep learning inference can wait until a minimum amount of data is received from the rectified RGB pipeline, and at $t_0+z$ the pipelined deep learning inference can begin processing the data. The pipelined deep learning inference can incrementally process the data as the data is received, and at $t_1+x+z$ the pipelined deep learning inference can output one or more results. By incrementally processing sensor data 136 (e.g., RGB rectified sensor data), the pipelined deep learning inference can output the one or more results much quick than the traditional deep learning inference. This can allow the results to be utilized by an autonomous vehicle sooner for better motion control and quicker response time.

Figure 5:
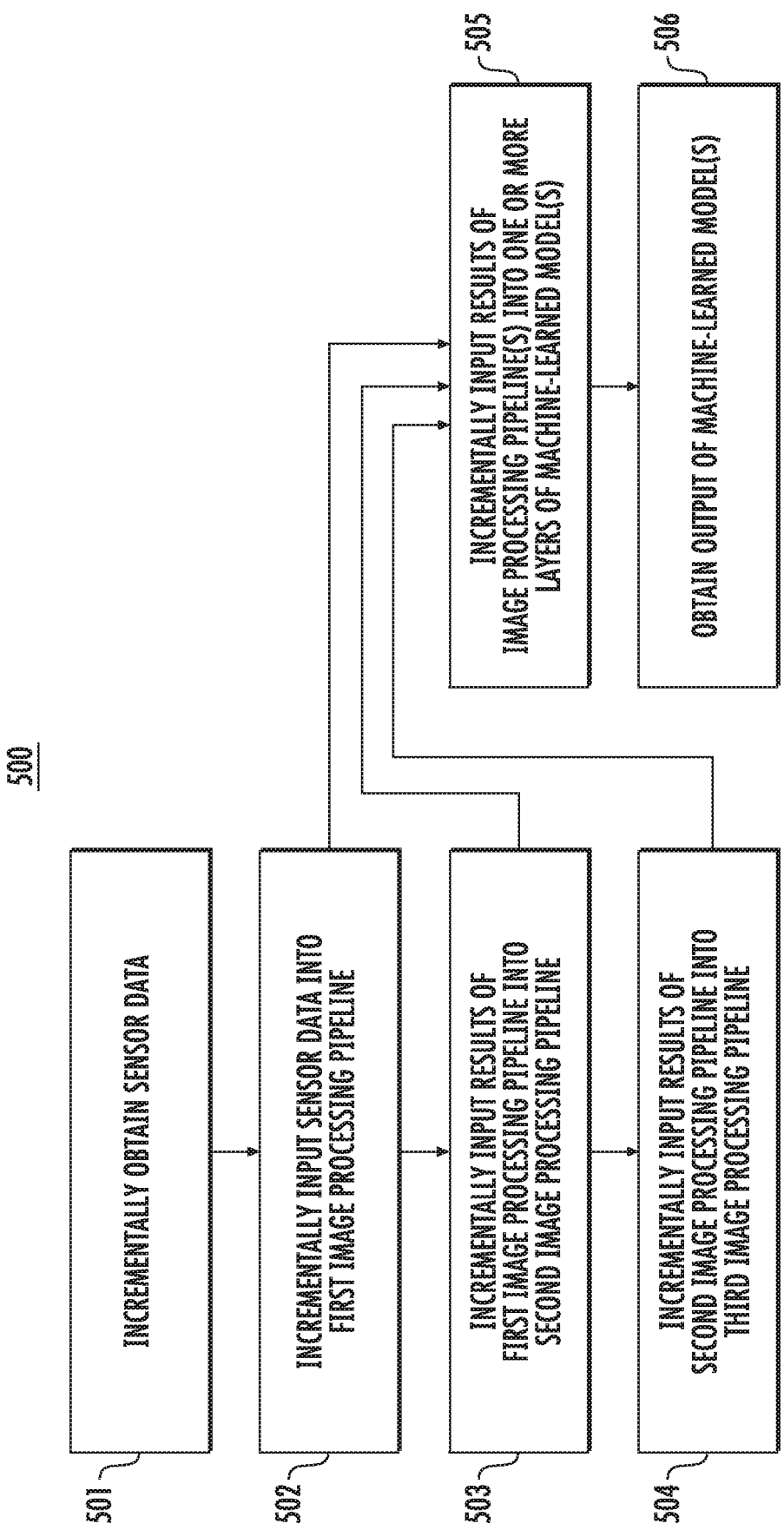
FIG. 5 depicts a flow diagram of an example method for an image processing according to example embodiments of the present disclosure.
Figure 6:
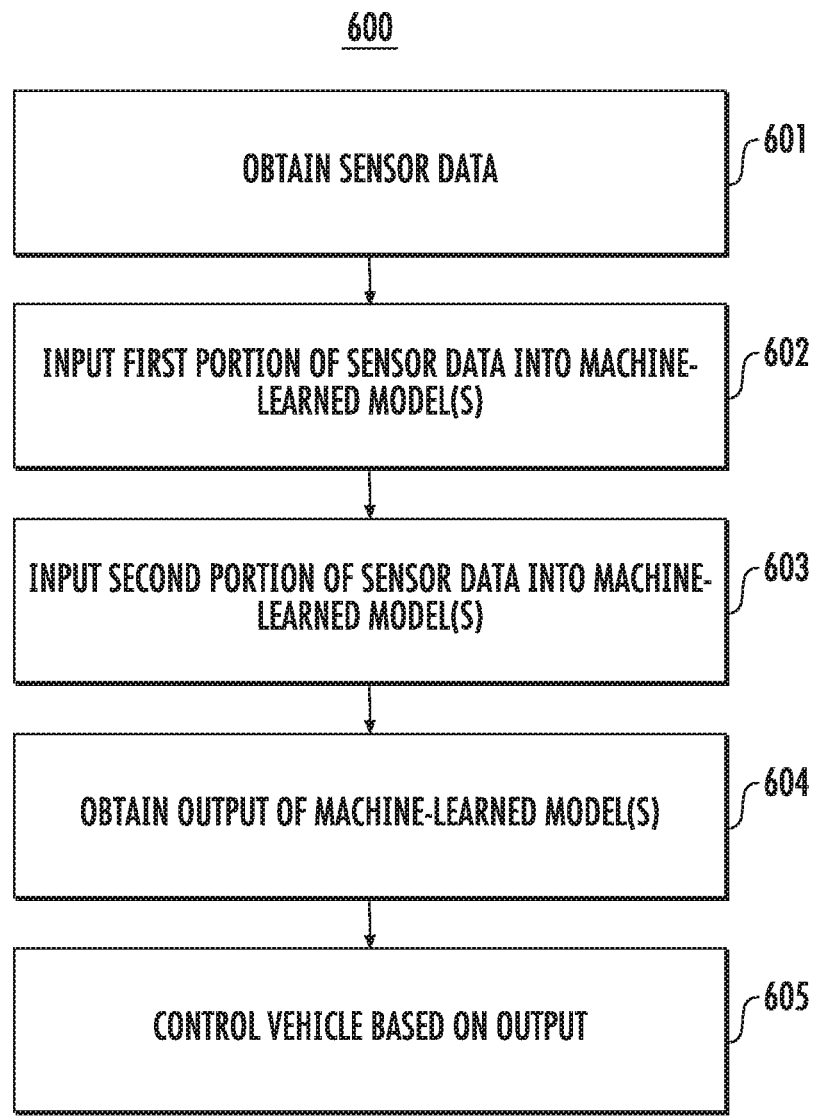
FIG. 6 depicts a flow diagram of an example method for processing sensor data according to example embodiments of the present disclosure.

FIGS. 5 and 6 depicts flow diagrams of example methods 500 and 600 for an image processing system and for processing sensor data, respectively, according to example embodiments of the present disclosure. One or more portion(s) of the methods 500 and 600 can be implemented as operations by one or more computing system(s) such as computing system(s) 103, and 710 shown in FIGS. 1 and 7. For example, FIGS. 5 and 6 illustrate certain operations being performed by specific computing systems described herein. However, it should be appreciated that such operations may generally be performed by any suitable computing system or combination of computing systems consistent with the disclosure provided herein. Moreover, one or more portion(s) of the methods 500 and 600 can be implemented as an algorithm on the hardware components of the system(s) described herein (e.g., as in FIGS. 1 and 7), for example, to control a vehicle based on sensor data. FIGS. 5 and 6 depict elements performed in a particular order for purposes of illustration and discussion. Those of ordinary skill in the art, using the disclosures provided herein, will understand that the elements of methods 500 and 600 discussed herein can be adapted, rearranged, expanded, omitted, combined, and/or modified in various ways without deviating from the scope of the present disclosure.

FIG. 5 depicts a flow diagram of method 500 for an image processing system according to example embodiments of the present disclosure. At (501), the method 500 includes incrementally obtaining sensor data. For example, sensor data processing system 138 can include an FPGA device coupled to sensor(s) 124 that are configured to obtain sensor data 136 corresponding to an image frame. Sensor data processing system 138 (e.g., FPGA device) can be configured to incrementally receive sensor data 136 as the data becomes available and to implement one or more image processing pipelines for pre-processing sensor data 136. In some implementations, sensor data processing system 138 can receive sensor data 136 in one or more increments, and sensor data processing system 138 can pipeline the one or more increments of sensor data 136 into the one or more image processing pipelines as each increment of sensor data 136 is received. In some implementations, sensor data 136 is associated with a surrounding environment of vehicle(s) 10, and the one or more objects are located within the surrounding environment of the vehicle(s) 10. In some implementations, sensor data 136 is image data and each increment of sensor data 136 corresponds to a row of pixels in the image data. In some implementations, sensor data 136 is LIDAR data that represents a 360 degree scene of an environment, and each increment of sensor data 136 corresponds to an angular slice of the 360 degree scene.

At (502), the method 500 includes incrementally inputting sensor data into a first image processing pipeline. For example, sensor data processing system 138 can include a first image processing pipeline. The first image processing pipeline can include a first plurality of logic blocks and interconnectors programmed to incrementally receive sensor data 136 and incrementally perform one or more operations on sensor data 136 to extract one or more features from one or more increments of sensor data 136. In some implementations, the first plurality of logic blocks and interconnectors are programmed to extract the one or more features from each increment of sensor data 136 in parallel. In some implementations, the first plurality of logic blocks and interconnectors are programmed to extract the one or more features associated with a state of the one or more objects indicated within the sensor data. The first image processing pipeline can generate first input data as an output, in response to receiving sensor data 136.

At (503), the method 500 includes incrementally inputting results of the first image processing pipeline into a second image processing pipeline. For example, sensor data processing system 138 can include a second image processing pipeline. The second image processing pipeline can include a second plurality of logic blocks and interconnectors programmed to incrementally receive the first input data and incrementally perform one or more operations on the first input data to extract one or more features from one or more increments of the first input data. The second image processing pipeline can generate second input data as an output, in response to receiving the first input data.

At (504), the method 500 includes incrementally inputting results of the second image processing pipeline into a third image processing pipeline. For example, sensor data processing system 138 can include a third image processing pipeline. The third image processing pipeline can include a third plurality of logic blocks and interconnectors programmed to incrementally receive the second input data and incrementally perform one or more operations on the second input data to extract one or more features from one or more increments of the second input data. The third image processing pipeline can generate third input data as an output, in response to receiving the second input data.

At (505), the method 500 includes incrementally inputting results of one or more image processing pipelines into one or more layers of one or more machine-learned models. For example, sensor data processing system 138 can include one or more memory devices that are configured to store a representation of one or more machine-learned models that detects or classifies one or more objects indicated within sensor data 136. At (502), sensor data processing system 138 can incrementally input the first input data into one or more layers of the machine-learned model(s). At (503), sensor data processing system 138 can incrementally input the second input data into one or more layers of the machine-learned model(s). At (504) sensor data processing system 138 can incrementally input the third input data into one or more layers of the machine-learned model(s). In some implementations, sensor data processing system 138 can include a fourth plurality of logic blocks and interconnectors programmed to implement the machine-learned model(s).

At (506), the method 500 includes obtaining an output of the one or more machine-learned models. For example, sensor data processing system 138 can include machine-learned model(s) that can incrementally process the first input data, second input data, and third input data as the first, second, and third input data is received at the one or more layers, to provide an output indicative of a detection or classification of the one or more objects indicated within sensor data 136. In some implementations, the fourth plurality of logic blocks and interconnectors are programmed to provide an output indicative of a detection or classification of one or more objects indicated within sensor data 136 in response to receiving input data (e.g., first input data, second input data, and third input data) that corresponds to the entire image frame.

FIG. 6 depicts a flow diagram of method 600 for processing sensor data according to example embodiments of the present disclosure. At (601), the method 600 includes obtaining sensor data. For example, sensor data processing system 138 can obtain sensor data 136 that is incrementally outputted by sensor(s) 124 as sensor data 136 becomes available. Sensor data 136 can include a plurality of increments of data, and sensor data processing system 138 can incrementally receive each of the plurality of increments of data. In some implementations, sensor(s) 124 is located onboard vehicle(s) 10, sensor data 136 is associated with a surrounding environment of the vehicle(s) 10, and the one or more objects are located within the surrounding environment of the vehicle(s) 10. In some implementations, sensor data 136 is image data and each increment of sensor data 136 corresponds to a row of pixels in the image data. In some implementations, sensor data 136 is LIDAR data that represents a 360 degree scene of an environment, and each increment of sensor data 136 corresponds to an angular slice of the 360 degree scene.

In some implementations, sensor data processing system 138 can include pre-programmed circuitry to obtain sensor data 136 that includes a first portion corresponding to a portion of an image frame from sensor(s) 124. In some implementations, the pre-programmed circuitry can detect a sensor trigger that initiates a transfer of sensor data 136 from sensor(s) 124 to a memory device, and the pre-programmed circuitry can obtain sensor data 136 as the data is transferred from sensor(s) 124 to the memory device.

At (602), the method 600 includes inputting a first portion of sensor data into one or more machine-learned models. For example, sensor data processing system 138 can determine a number of increments of data associated with a first inference operation. Sensor data processing system 138 can input a first portion of sensor data 136 into one or more machine-learned model(s) upon receipt of the first portion of sensor data 146. The first portion of the sensor data 136 can include a subset of the plurality of increments of data that corresponds to the number of increments associated with the first inference operation, and the machine-learned model(s) can cause the first inference operation to be performed on the first portion of sensor data 136. In some implementations, sensor data processing system 138 includes an FPGA configured to perform the first inference operation, and sensor(s) 124 is configured to communicate directly with the FPGA. In some implementations, sensor(s) 124 and the FPGA are installed on a single chip.

In some implementations, sensor data processing system 138 can include pre-programmed circuitry to pipeline the first portion of sensor data 136 into the machine-learned model(s) before sensor data 136 corresponding to the entire image frame is transferred from sensor(s) 124 to a memory device. The machine-learned model(s) can cause one or more inference operations to be performed on the first portion of sensor data 136. The one or more inference operations can be associated with the detection or classification of the one or more objects indicated in the image frame. In some implementations, the pre-programmed circuitry can generate rectified RGB data based on sensor data 136, and pipeline the rectified RGB data into the machine-learned model(s). In some implementations, the pre-programmed circuitry can pipeline the first portion of sensor data 136 into the machine-learned model(s) before a second time when a second portion of sensor data 136 that corresponds to a second portion of the image frame is transferred from sensor(s) 124 to the memory device. In some implementations, the pre-programmed circuitry can include the FPGA.

At (603), the method 600 includes inputting a second portion of sensor data into one or more machine-learned models. For example, sensor data processing system 138 can input a second portion of sensor data 136 into the machine-learned model(s). The second portion of sensor data 136 can correspond to the number of increments of data associated with the first inference operation, and the second portion of sensor data 136 can include at least one increment of data included in the first portion of sensor data 136 and at least one increment of data that was not included in the first portion of sensor data 136.

In some implementations, sensor data processing system 138 can determine a number of increments associated with a second inference operation. Sensor data processing system 138 can input a third portion of sensor data 136 into the machine-learned model(s) upon receipt of the third portion of sensor data 136. The third portion of sensor data 136 can correspond to the number of increments of data associated with the second inference operation, and the machine-learned model(s) can cause the second inference operation to be performed on the third portion of sensor data 136. In some implementations, the first portion of sensor data 136 and the third portion of sensor data 136 are simultaneously input into the machine-learned model(s).

At (604), the method 600 includes obtaining an output of one or more machine-learned model(s). For example, sensor data processing system 138 can obtain an output of the machine-learned model(s) based at least in part on the first inference operation. In some implementations, sensor data processing system 138 can obtain the output of the machine-learned model(s) based on the first inference operation and one or more additional inference operations (e.g., second inference operation, third inference operation, etc.). The output of the machine-learned model(s) can include a classification of one or more objects indicated within the sensor data 136.

In some implementations, sensor data processing system 138 can include pre-programmed circuitry to generate the output of the machine-learned model(s), in response to pipelining sensor data 136 corresponding to each portion of an image frame into the machine-learned model(s), the output including a detection or classification of the one or more objects indicated within sensor data 136.

At (605), the method 600 includes controlling a vehicle based on the output of one or more machine-learned model(s). For example, sensor data 136 can correspond to an environment of vehicle(s) 10, and sensor data processing system 138 can control vehicle(s) 10 to navigate the environment based at least in part on the classification of the one or more objects indicated within the sensor data 136.

Figure 7:
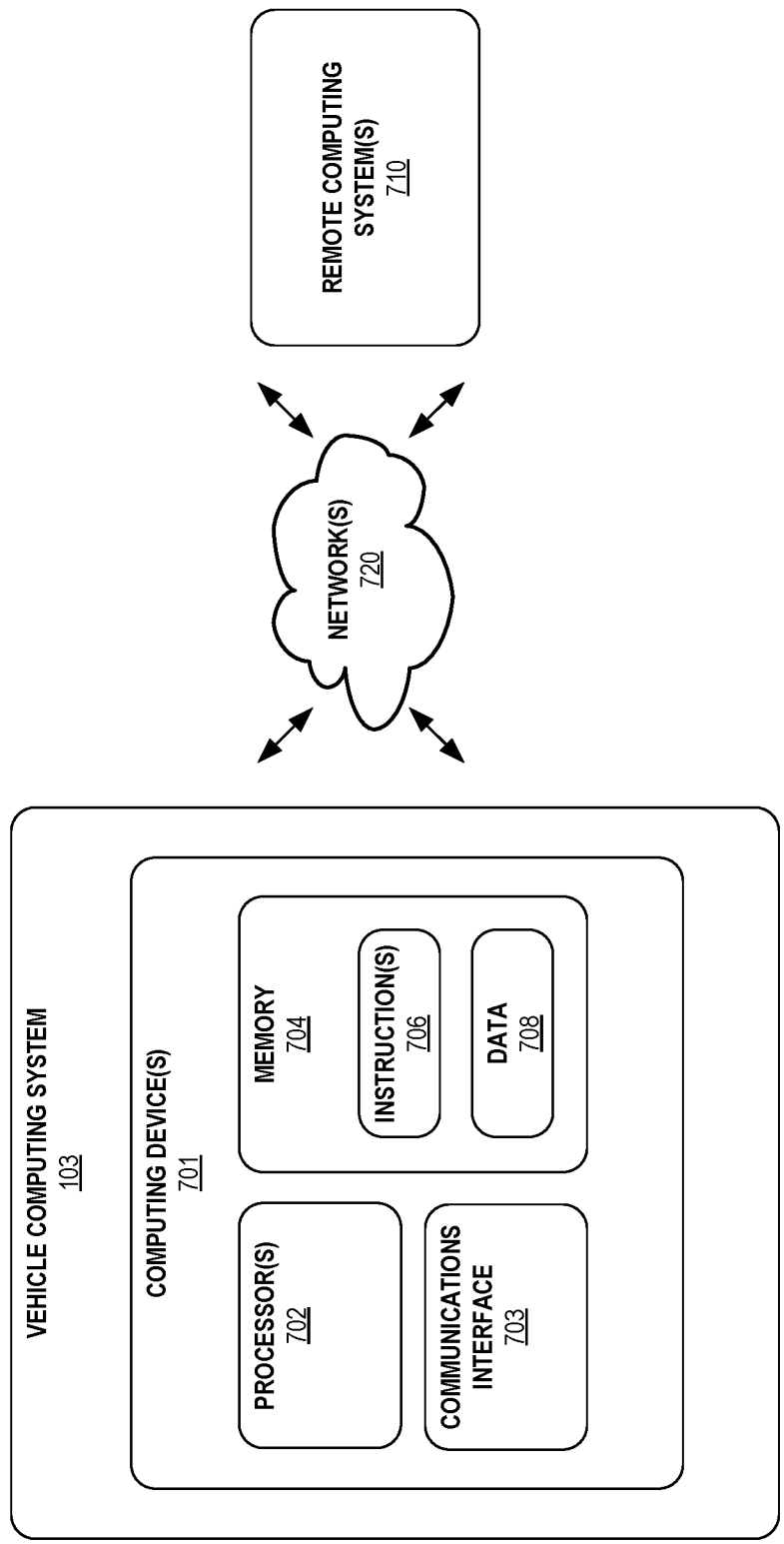
FIG. 7 depicts example system components according to example embodiments of the present disclosure.

FIG. 7 depicts an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include vehicle computing system 103 of vehicle(s) 10 and, in some implementations, remote computing system(s) 710 including one or more remote computing system(s) that are remote from vehicle(s) 10 that can be communicatively coupled to one another over one or more networks 720. The remote computing system 710 can be associated with a central operations system and/or an entity associated with the vehicle(s) 10 such as, for example, a fleet operator, service provider, etc.

The computing device(s) 701 of the vehicle computing system 103 can include processor(s) 702 and a memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be accessed by the one or more processors 702. For instance, the memory 704 (e.g., one or more non-transitory computer-readable storage mediums, memory devices) on-board the vehicle(s) 10 can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle(s) 10 can store instructions 706 that when executed by the one or more processors 702 on-board the vehicle(s) 10 cause the one or more processors 702 (the vehicle computing system 103) to perform operations such as any of the operations and functions of the vehicle computing system 103, as described herein, one or more operations of method 500 or 600, and/or any other operations and functions of the vehicle computing system 103, as described herein.

The memory 704 can store data 708 that can be obtained, received, accessed, written, manipulated, created, and/or stored. The data 708 can include, for instance, data associated with sensors, perception, prediction, motion plan, and/or other data/information as described herein. In some implementations, the computing device(s) 701 can obtain data from one or more memory device(s) that are remote from the vehicle(s) 10.

The computing device(s) 701 can also include a communication interface 703 used to communicate with one or more other system(s) on-board the vehicle(s) 10 and/or a remote computing device that is remote from the vehicle(s) 10 (e.g., of remote computing system(s) 710). The communication interface 703 can include any circuits, components, software, etc. for communicating via one or more networks (e.g., 720). In some implementations, the communication interface 703 can include, for example, one or more of a communications controller, receiver, transceiver, transmitter, port, conductors, software, and/or hardware for communicating data.

The network(s) 720 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 720 can be accomplished, for instance, via a communication interface using any type of protocol, protection scheme, encoding, format, packaging, etc.

The remote computing system 710 can include one or more remote computing devices that are remote from the vehicle computing system 103. The remote computing devices can include components (e.g., processor(s), memory, instructions, data) similar to that described herein for the computing device(s) 701. Moreover, the remote computing system(s) 710 can be configured to perform one or more operations of the vehicle computing system 103, as described herein. Moreover, the computing systems of other vehicle(s) 10 described herein can include components similar to that of vehicle computing system 103.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An image processing system, comprising:
   a field programmable gate array (FPGA) device coupled to one or more sensors that are configured to obtain LIDAR sensor data comprising a plurality of pixels arranged in a plurality of rows and a plurality of columns, the FPGA device comprising one or more memory devices that are configured to store a machine-learned model that detects or classifies one or more objects based on the LIDAR sensor data, the FPGA device further configured to receive a particular increment of the LIDAR sensor data through one or more image processing operations for pre-processing the LIDAR sensor data, wherein the particular increment of the LIDAR sensor data includes pixels arranged in at least two consecutive rows and at least two consecutive columns of the LIDAR sensor data, wherein a number of pixels included in the particular increment is based on the number of pixels associated a first inference operation,
   wherein the FPGA device is further configured to, through the one or more image processing operations, extract one or more features from the particular increment of the LIDAR sensor data and generate first input data based on the one or more features, the first input data includes a plurality of increments of the first input data, and
   wherein the first input data is input as one or more increments of the plurality of increments to one or more layers of the machine-learned model, the machine-learned model configured to process the one or more increments of the first input data to provide an output indicative of a detection or classification of the one or more objects.

2. The image processing system of claim 1, wherein the FPGA device receives the LIDAR sensor data in the one or more increments and the FPGA pipelines the one or more increments of the LIDAR sensor data into the one or more image processing operations as each increment of the LIDAR sensor data is received.

3. The image processing system of claim 1, wherein the one or more image processing operations include a first plurality of logic blocks and interconnectors and a second plurality of logic blocks and interconnectors, wherein the first plurality of logic blocks and interconnectors are programmed to provide the first input data to the second plurality of logic blocks and interconnectors programmed to receive the first input data and generate second input data as each increment of the first input data is output by the first plurality of logic blocks and interconnectors, and
   wherein the second input data is input as one or more increments to one or more layers of the machine-learned model, the machine-learned model processing each increment of the second input data as the second input data is received at the one or more layers, to provide the output indicative of the detection or classification of the one or more objects.

4. The image processing system of claim 3, wherein the first plurality of logic blocks and interconnectors are programmed to extract the one or more features from each increment of the LIDAR sensor data in parallel.

5. The image processing system of claim 3, wherein the first plurality of logic blocks and interconnectors are programmed to extract the one or more features associated with a state of the one or more objects.

6. The image processing system of claim 1, wherein the one or more image processing operations include a third plurality of logic blocks and interconnectors programmed to implement the machine-learned model, and to provide the output indicative of the detection or classification of the one or more objects based on the LiDAR sensor data in response to receiving the first input data and the second input data that corresponds to an entire image frame.

7. The image processing system of claim 1, wherein the LIDAR sensor data is associated with a surrounding environment of an autonomous vehicle, and wherein the one or more objects are located within the surrounding environment of the autonomous vehicle.

8. The image processing system of claim 1, wherein the LIDAR sensor data is image data and each increment of data corresponds to a row of pixels in the image data.

9. The image processing system of claim 1, wherein the LIDAR sensor data represents a 360 degree scene of an environment, and each increment of the LIDAR sensor data corresponds to an angular slice of the 360 degree scene.

10. The image processing system of claim 1, wherein detecting one or more objects can comprise, determining, based on the LIDAR sensor data, a location and size of one or more objects within a surrounding environment of an autonomous vehicle.

11. An autonomous vehicle, comprising:
    a field programmable gate array (FPGA) device coupled to one or more sensors that are configured to obtain LIDAR sensor data comprising a plurality of pixels arranged in a plurality of rows and a plurality of columns, the FPGA device comprising one or more memory devices that are configured to store a machine-learned model that detects or classifies one or more objects based on the LIDAR sensor data, the FPGA device further configured to receive a particular increment of the LIDAR sensor data through one or more image processing operations for pre-processing the LIDAR sensor data, wherein the particular increment of the LIDAR sensor data includes pixels arranged in at least two consecutive rows and at least two consecutive columns of the LIDAR sensor data wherein a number of pixels included in the particular increment is based on the number of pixels associated with a first inference operation,
- wherein the FPGA device is further configured to, through the one or more image processing operations, extract one or more features from the particular increment of the LIDAR sensor data and generate first input data based on the one or more features, the first input data includes a plurality of increments of the first input data, and
- wherein the first input data is input as one or more increments of the plurality of increments to one or more layers of the machine-learned model, the machine-learned model configured to process the one or more increments of the first input data to provide an output indicative of a detection or classification of the one or more objects.

12. The autonomous vehicle of claim 11, wherein the FPGA device receives the LIDAR sensor data in the one or more increments and the FPGA pipelines the one or more increments of the LIDAR sensor data into the one or more image processing operations as each increment of the LIDAR sensor data is received.

13. The autonomous vehicle of claim 11, wherein the one or more image processing operations include a first plurality of logic blocks and interconnectors and a second plurality of logic blocks and interconnectors, wherein the first plurality of logic blocks and interconnectors are programmed to provide the first input data to the second plurality of logic blocks and interconnectors programmed to receive the first input data and generate second input data as each increment of the first input data is output by the first plurality of logic blocks and interconnectors, and
- wherein the second input data is input as one or more increments to one or more layers of the machine-learned model, the machine-learned model processing each increment of the second input data as the second input data is received at the one or more layers, to provide the output indicative of the detection or classification of the one or more objects.

14. A computer-implemented method comprising:
obtaining, by a field programmable gate array (FPGA) device coupled to one or more sensors, LIDAR sensor data comprising a plurality of pixels arranged in a plurality of rows and a plurality of columns, the FPGA device comprising one or more memory devices that are configured to store a machine-learned model that detects or classifies one or more objects based on the LIDAR sensor data;
receiving, by the FPGA device, a particular increment of the LIDAR sensor data through one or more image processing operations for pre-processing the LIDAR sensor data, wherein the particular increment of the LIDAR sensor data includes pixels arranged in at least two consecutive rows and at least two consecutive columns of the LIDAR sensor data, wherein a number of pixels included in the particular increment is based on the number of pixels associated with a first inference operation;
extracting, by the FPGA device through one or more image processing operations, one or more features from the particular increment of the LIDAR sensor data and generating first input data based on the one or more features, the first input data includes a plurality of increments of the first input data; and
inputting, by the FPGA device, the first input data as one or more increments of the plurality of increments to one or more layers of the machine-learned model, the machine-learned model configured to process the one or more increments of the first input data to provide an output indicative of a detection or classification of the one or more objects.

15. The computer-implemented method of claim 14, further comprising:
inputting, by the FPGA device, a second input data into the machine-learned model, wherein the second input data corresponds to the number of pixels associated with the first inference operation, and the second input data includes at least one increment of data included in the first input data and at least one increment of data that was not included in the first input data.

16. The computer-implemented method of claim 14, further comprising:
determining, by the FPGA device, a number of increments associated with a second inference operation;
inputting, by the FPGA device into the machine-learned model, a third input data upon receipt of the third input data, wherein the third input data corresponds to the number of increments of data associated with the second inference operation, and the machine-learned model causes the second inference operation to be performed on the third input data.

17. The computer-implemented method of claim 16, wherein the first input data and the third input data are simultaneously input into the machine-learned model.

18. The computer-implemented method of claim 14, wherein the FPGA device is configured to perform the first inference operation, and wherein the one or more sensors are configured to communicate directly with the field programmable gate array.

19. The computer-implemented method of claim 18, wherein the LIDAR sensor and the field programmable gate array are installed on a single chip.

20. The computer-implemented method of claim 14, wherein the LIDAR sensor data corresponds to an environment of an autonomous vehicle, and the method further comprises:
controlling, by the FPGA device, the autonomous vehicle to navigate the environment based at least in part on the classification of the one or more objects based on the LIDAR sensor data.

* * * * *